No. 891,990.  
PATENTED JUNE 30, 1908.  
F. M. HENRY & J. M. POWERS.  
NUT LOCK.  
APPLICATION FILED MAR. 20, 1905.

WITNESSES  
M. McGinnis  
C. Macnamara

INVENTORS  
FRANCIS M. HENRY  
JOHN M. POWERS  
BY Paul H Paul  
THEIR ATTORNEYS

UNITED STATES PATENT OFFICE.

FRANCIS M. HENRY AND JOHN M. POWERS, OF MINNEAPOLIS, MINNESOTA.

NUT-LOCK.

No. 891,990.      Specification of Letters Patent.      Patented June 30, 1908.

Application filed March 20, 1905. Serial No. 250,935.

*To all whom it may concern:*

Be it known that we, FRANCIS M. HENRY and JOHN M. POWERS, both of Minneapolis, Hennepin county, Minnesota, have invented certain new and useful Improvements in Nut-Locks, of which the following is a specification.

Our invention relates to nut locks adapted for use wherever it is desired to secure a nut on a bolt and particularly designed for use in railroad work.

The object of our invention is to provide a nut lock that is simple and inexpensive to manufacture and easily operated without the use of special tools.

The invention consists generally in various constructions and combinations, all as hereinafter described and particularly pointed out in the claims.

Figure 3:
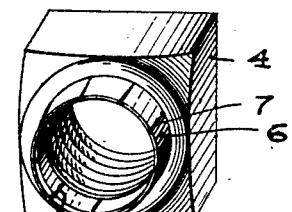
Figure 1:
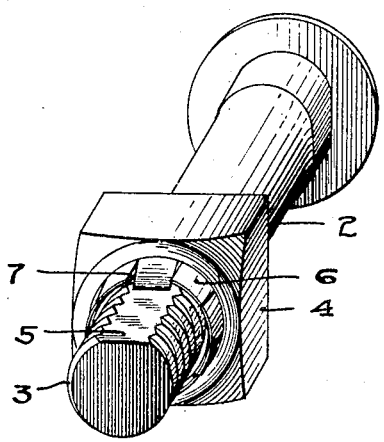
Figure 2:
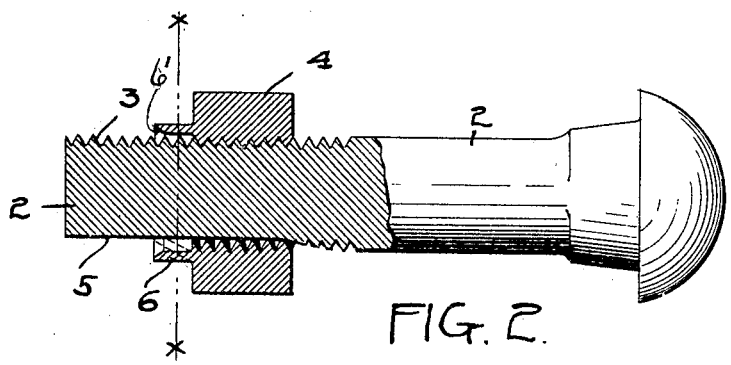
Figure 6:
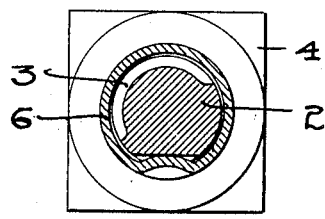
Figure 4:
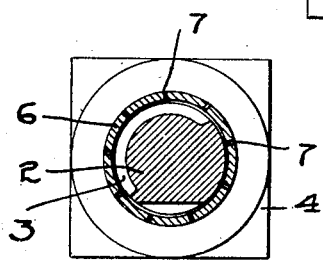
Figure 5:
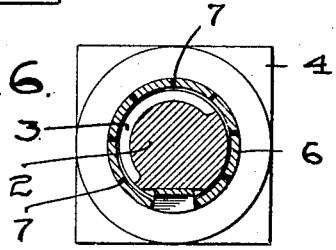

In the accompanying drawing, forming part of this specification; Figure 1 is a perspective view of a bolt and nut embodying our invention. Fig. 2 is a sectional view of one end of the bolt and the nut and locking device thereon. Fig. 3 is a perspective view of the nut. Fig. 4 is a sectional view on line x—x of Fig. 2. Fig. 5 is a similar view showing the nut locked on the plate. Fig. 6 is a sectional view illustrating a modified form of locking device.

In the drawing, 2 represents a bolt provided with the usual threads 3 and nut 4. It is desirable to provide some means for locking the nut on the bolt to prevent its accidental turning and we, therefore, provide a flat surface 5 at one end of the bolt and a flange 6 on the nut, the flange being formed when the nut is made and projecting from one end thereof over the threads on the bolt.
The flange is provided with a beveled edge 6' (as shown clearly in Fig. 2), and when it is pressed down upon the flat surface of the bolt the beveled edge will rest squarely thereon and form a broad bearing surface and prevent any possibility of the nut turning in either direction.

A series of slits 7 are provided in the flange, dividing it into a series of lugs that are capable of being pressed or struck down upon the flat surface 5 to prevent accidental turning of the nut in either direction. The slits are preferably so apportioned in the flange as to make the lugs or tongues of less width than the flat surface of the bolt. If the flat surface happens to be directly under one of the lugs composing the flange, then that lug will be forced down by the blow of a hammer or other tool and will rest squarely upon the flat surface 5, as shown in Fig. 1. Should, however, the flat surface be partly under one lug and partly under the contiguous one, then the abutting edges of the two lugs can be struck down together upon the bolt so that it is immaterial where the flat surface may be with respect to the lugs when it is desired to lock the nut, as either one or more of the lugs can be pressed down to perform the locking operation. The ends of the threads at the edges of the flat surface will be below or on a level with said surface and will not be battered or injured by the striking down of the lugs, and consequently the nut can be locked and unlocked a number of times without the bolt threads becoming worn or injured. This is due principally to the use of the comparatively broad flat surface with which the lugs engage.

Where the bolt is used in railroad work as at the joints of the rails, it is desirable to use a lock nut that can be operated without the use of special tools. We have found our invention particularly suitable for this purpose. The lugs can be struck down with an ordinary track hammer, or other tool, used by the section men or track walkers, and whenever it is desired to remove a bolt the edge of a chisel, or other tool can be inserted under the lug for the purpose of raising it to clear the flat surface and allow the nut to be turned off the bolt or tightened, if preferred.

In Fig. 6 we have shown a modification in the construction of the invention, which consists in omitting the slits 7 and using a continuous flange extending entirely around the opening in the nut. Any portion of this flange can be forced down upon the flat surface of the bolt, and it will be impossible to turn the nut until the depressed portion has been lifted sufficiently to clear the flat surface. In this modification, as in the construction first described, the ends of the threads are at each side of the flat surface (as shown in Fig. 6), and there is no danger of their being battered or broken by the operation of locking the nut.

We claim as our invention:

1. The combination with a threaded bolt formed with a flat surface on one side thereof and having the ends of the threads below or on a level with the plane of the flat surface, of a nut provided with a projecting flange lying wholly outside of the face of the nut and having its outer edge beveled on the inside to bear against the flat surface of the bolt back from the ends of the threads on the bolt, substantially as described.

2. The combination with a threaded bolt formed with a flat surface on one side thereof and having the ends of the threads below or on a level with the plane of the flat surface, of a nut provided with a slitted flange projecting from and lying wholly outside of the face of the nut and having its outer edge beveled on the inside, said slitted flange forming a number of tongues each of less width than the flat surface of the bolt and adapted to be depressed against said surface, substantially as described.

In witness whereof, we have hereunto set our hands this 14th day of March 1905.

FRANCIS M. HENRY.
JOHN M. POWERS.

Witnesses:
RICHARD PAUL,
C. MACNAMARA.